United States Patent [19]
Schefczik

[11] 3,818,037
[45] June 18, 1974

[54] 3-METHYLENE-6-NITRO-N-SUBSTITUTED ISOINDOLONES-(1)
[75] Inventor: Ernst Schefczik, Ludwigshafen, Germany
[73] Assignee: Badische Anilin- & Soda-Fabrik Aktiengesellschaft, Ludwigshaffen/Rhein, Germany
[22] Filed: Nov. 8, 1971
[21] Appl. No.: 196,787

[52] U.S. Cl. ............................................. 260/325
[51] Int. Cl. ........................................... C07d 27/50
[58] Field of Search ................................... 260/325

[56] References Cited
UNITED STATES PATENTS
3,224,999  12/1965  Walker ............................. 260/41.5

Primary Examiner—Joseph A. Narcavage
Attorney, Agent, or Firm—Johnston, Keil, Thompson & Shurtleff

[57] ABSTRACT 3-methylene-6-nitro-N-substituted isoindolones-(1) produced by reacting 6-nitro-N-substituted isoindolones-(1) with formaldehyde or an agent yielding formaldehyde. The new compounds are starting materials for the production of dyes.

1 Claim, No Drawings

3-METHYLENE-6-NITRO-N-SUBSTITUTED ISOINDOLONES-(1)

The invention relates to compounds of the general formula (I):

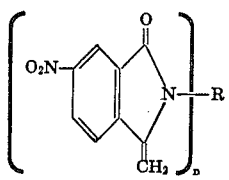

in which n is one of the integers 1 and b 2;

R is unsubstituted or substituted alkyl or cycloalkyl when n is 1, or alkylene of two to six carbon atoms or cyclohexylene when n is 2, and also to a process for the production of these compounds.

R may, for example, be alkyl of one to eight carbon atoms, hydroxyalkyl of two to six carbon atoms, alkoxyalkyl of a total of three to eight carbon atoms or cycloalkyl of five to eight ring members, and also ethylene, propylene, butylene, hexylene or cyclohexylene-1,4.

In particular, when n denotes 1, the following are suitable: methyl, ethyl, n-propyl, isopropyl, n-butyl, isobutyl, t-butyl, pentyl, β-ethylhexyl, β-hydroxyethyl, β-hydroxypropyl, γ-hydroxypropyl, β-methoxyethyl, γ-methoxypropyl, γ-ethoxypropyl, γ-butoxypropyl, cyclopentyl, cyclohexyl, methylcyclohexyl, trimethylcyclohexyl, cyclooctyl and radicals of the formulae: -$C_2H_4CONH_2$, $C_2H_4COOH$, $C_2H_4COOCH_3$, $C_2H_4COOC_4H_9$, $C_2H_4CON(CH_3)_2$, $C_2H_4CON(C_2H_5)_2$, $C_2H_4CONHC_4H_9$, $C_2H_4CONHCH_2CH_2OH$ or $C_2H_4CON(CH_2CH_2OH)_2$.

Alkyl and alkoxyalkyl are preferred for R.

The process for the production of compounds of the formula (I) consists in reacting a compound of the formula (II):

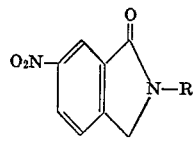

with formaldehyde or with an agent yielding formaldehyde.

The process is expediently carried out by reacting the nitro compound in aqueous or aqueous-organic formaldehyde solution, preferably in the presence of a basic condensing agent.

Examples of basic condensing agents are: piperidine, pyrrolidine, morpholine, pyridine, triethylamine, diethylamine, potassium carbonate, sodium carbonate, sodium hydroxide and potassium hydroxide.

Examples of agents yielding formaldehyde are paraformaldehyde and urotropine, but the use of formaldehyde itself is preferred.

The reaction is preferably carried out at elevated temperature, for example 79° to 100°C. It is sufficient to use equivalent amounts of the reactants but there is no harm in a major excess of formaldehyde.

Examples of suitable aqueous-organic solutions are mixtures of water with methanol, ethanol, gylcol, methyl glycol, ethyl glycol, diethylene glycol, dioxane, pyridine, dimethylformamide or N-methyl-pyrrolidone.

Details of the production of the new compounds are given in the following Examples.

The new compounds of the formula (I) are valuable intermediates for the production of dyes.

EXAMPLE 1

192 parts of 2-methyl-6-nitroisoindol-1-one is boiled in 240 parts by volume of 30 percent aqueous formaldehyde solution. 2 parts by volume of piperidine is added to the clear solution which is then boiled for four hours. The reaction product separates in crystalline form while still at the boiling point. After cooling, 200 parts by volume of ice-water is added and the product is suction filtered, washed with water and dried. 197 parts of 2-methyl-3-methylene-6-nitro-isoindol-1-one is obtained as colorless crystals having a melting point of 185° to 186°C (recrystallized from amyl alcohol).

$C_{10}H_8N_2O_3$ (204)

|  | C | H | N | O |
|---|---|---|---|---|
| calculated | 58.9 | 3.9 | 13.7 | 23.6 |
| found | 59.2 | 4.1 | 13.4 | 23.5 |

EXAMPLE 2

234 parts of N-butyl-6-nitroisoindol-1-one is dissolved in 400 parts by volume of methyl glycol at 100°C. 120 parts of 40 percent aqueous formaldehyde solution and 10 parts by volume of piperidine are added and the whole is stirred for four hours at 105°C. The solution is then poured into 1,000 parts of water and allowed to stand overnight. By that time the reaction product has settled as a cake of crystals. The supernatant liquid is decanted off, and the cake of crystals is washed several times with water and then dried at 50°C at subatomspheric pressure. 236 parts of N-butyl-3-methylene-6-nitroisoindol-1-one is obtained. A sample recrystallized from ethanol melts at 112°C.

EXAMPLE 3

250 parts of N-(γ-methoxypropyl)-6-nitroisoindol-1-one, 250 parts by volume of methyl glycol, 150 parts by volume of 40 percent aqueous formaldehyde solution and 25 parts by volume of piperidine are stirred for eight hours at 100°C. The mixture is diluted with water until turbidity begins and then allowed to cool while stirring. Twenty-four hours later the deposited crystals are suction filtered, washed with water and dried. 186 parts of N-(γ-methoxypropyl)-3-methylene-6- nitroisoindol-1-one is obtained having a melting point of 131° to 132°C.

EXAMPLE 4

250 parts of N-(β-carboxyethyl)-6-nitroisoindol-1-one and 500 parts by volume of aqueous 30 percent formaldehyde solution are boiled. 5 parts by volume of piperidine is added and the whole boiled for two hours. The reaction product begins to crystallize during cooling. 500 parts of ice-water and 20 parts of concentrated hydrochloric acid are added to the reaction mixture which is then suction filtered, washed with water and dried. 236 parts of N-(β-carboxyethyl)-3-methylene-6-nitroisoindol-1-one is obtained having a melting point of 220°C (with decomposition).

EXAMPLE 5

A mixture of 500 parts by volume of dioxane, 150 parts by volume of 40 percent aqueous formaldehyde solution, 290 parts of N-(β-ethylhexyl)-6-nitrolisoindol-1-one and 25 parts by volume of piperidine is boiled under reflux for six hours. The reaction mixture is then poured into 1,000 parts of water and the deposited oil is taken up in chloroform. The chloroform solution is made neutral with acetic acid, washed with water and dried over potassium carbonate. After filtering the product and distilling off the solvent, 291 parts of N-(β-ethylhexyl)-3-methylene-6-nitroisoindol-1-one remains as a highly viscous oil. The compound cannot be distilled without decomposition.

EXAMPLE 6

260 parts of N-cyclohexyl-6-nitroisoindol-1-one is dissolved in 400 parts by volume of pyridine with heating. 200 parts by volume of 40 percent formaldehyde solution and 10 parts by volume of piperidine are added and the whole is boiled for two hours. The solution is then poured onto ice and excess hydrochloric acid and the precipitated product is suction filtered, washed with water and dried. 268 parts of N-cyclohexyl-3-methylene-6-nitroisoindol-1-one is obtained. A sample recrystallized from amyl alcohol melts at 195°C.

EXAMPLE 7

38.2 parts of the compound:

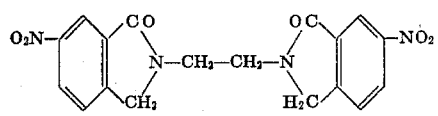

is introduced into a mixture of 500 parts by volume of pyridine and 30 parts by volume of 40 percent aqueous formaldehyde solution and boiled. The compound passes into solution after a short time and after about one hour the reaction product begins to crystallize out. The whole is boiled for a total of 6 hours, diluted with 500 parts by volume of water, suction filtered, washed with 1 percent acetic acid and dried. 32.3 parts of the compound of the formula:

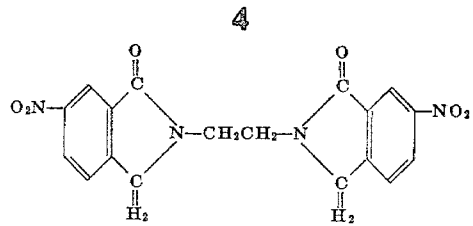

is obtained having a melting point of 292°C (with decomposition).

The compounds identified in the following Table by $n$ and R may be obtained by methods analogous to those described above:

| Example | n | R |
|---|---|---|
| 8 | 1 | $C_2H_5$ |
| 9 | 1 | $i-C_3H_7$ |
| 10 | 1 | $CH_2CH_2OH$ |
| 11 | 1 | $CH_2CH_2CH_2OH$ |
| 12 | 1 | $C_2H_4OC_4H_9$ |
| 13 | 1 | $C_3H_6OC_5H_{11}$ |
| 14 | 1 | $C_3H_6OC_2H_5$ |
| 15 | 1 | Cyclopentyl |
| 16 | 1 | Trimethylcyclohexyl |
| 17 | 1 | Cyclooctyl |
| 18 | 1 | $C_2H_4CONH_2$ |
| 19 | 1 | $C_2H_4COOCH_3$ |
| 20 | 1 | $C_2H_4COOC_4H_9$ |
| 21 | 1 | $C_2H_4COOCH_2-CH-C_4H_9$ <br> $\phantom{C_2H_4COOCH_2-}C_2H_5$ |
| 22 | 1 | $C_2H_4CON(CH_3)_2$ |
| 23 | 1 | $C_2H_4CON(C_3H_7)_2$ |
| 24 | 1 | $C_2H_4CONHC_4H_9$ |
| 25 | 2 | $(CH_2)_3$ |
| 26 | 2 | $(CH_2)_6$ |
| 27 | 2 | $(CH_2)_4$ |
| 28 | 2 | 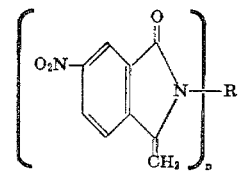 |

I claim:

1. A 3-methylene-6-nitroN-substituted isoindolone-(1) of the formula:

$$\left[ \begin{array}{c} O_2N-\underset{CH_2}{\underset{|}{\bigodot}}-N-R \\ \end{array} \right]_n \quad (I)$$

in which n is one of the integers 1 and 2 and R is methyl, ethyl, n-propyl, isopropyl, n-butyl, isobutyl, t-butyl, pentyl, β-ethyl-hexyl, β-hydroxyethyl, γ-hydroxypropyl, β-methoxyethyl, γ-methoxy-propyl, γ-ethoxypropyl, γ-butoxypropy, cyclopentyl, cyclohexyl, methylcyclohexyl, trimethylcyclohexyl, cyclooctyl or a radical of the formula $C_2H_4CONH_2$, $C_2H_4COOH$, $C_2H_4COOCH_3$, $C_2H_4COOC_4H_9$, $C_2H_4CON(CH_3)_2$, $C_2H_4CON(C_2H_5)_2$, $C_2H_4CONC_4H_9$, $C_2H_4CONHCH_2CH_2OH$ or $C_2H_4CON(CH_2CH_2OH)_2$ when n is 1 and R is alkylene of two to six carbon atoms or cyclo-hexylene when n is 2.

* * * * *

UNITED STATES PATENT AND TRADEMARK OFFICE
CERTIFICATE OF CORRECTION

PATENT NO. : 3,818,037
DATED : June 18, 1974
INVENTOR(S) : Ernst Schefczik

It is certified that error appears in the above-identified patent and that said Letters Patent are hereby corrected as shown below:

In Column 1, in the heading, insert--[30] Foreign Application Priority Data, November 13, 1970, Germany, P 20 55 816.1--;

Column 3, line 22, delete "nitrolisoindol" and substitute--nitroisoindol--;

Column 4, line 41, delete "nitroN" and substitute --nitro-N--;

Column 4, line 56, delete "2 and" and substitute --2; and--.

Signed and Sealed this twenty-fifth Day of November 1975

[SEAL]

Attest:

RUTH C. MASON
Attesting Officer

C. MARSHALL DANN
Commissioner of Patents and Trademarks